United States Patent [19]

Hattori

[11] Patent Number: 5,930,404

[45] Date of Patent: Jul. 27, 1999

[54] IMAGE PROCESSING SYSTEM AND METHOD

[75] Inventor: Toshiyuki Hattori, Nagano, Japan

[73] Assignee: Seiko Epson Corporation, Tokyo, Japan

[21] Appl. No.: 08/788,776

[22] Filed: Jan. 24, 1997

[30] Foreign Application Priority Data

Jan. 26, 1996 [JP] Japan ................................. 8-012111

[51] Int. Cl.$^6$ ................................. G06K 9/20
[52] U.S. Cl. .................. 382/283; 382/284; 382/260; 382/263; 382/290; 358/462; 358/463; 358/455
[58] Field of Search .................. 382/283, 284, 382/260, 263, 290, 237; 358/501, 462, 429, 475, 455, 458, 463

[56] References Cited

U.S. PATENT DOCUMENTS

| 5,204,752 | 4/1993 | Yamakawa | 358/296 |
| 5,259,042 | 11/1993 | Matsuki et al. | 382/50 |
| 5,406,379 | 4/1995 | Kingsley et al. | 358/298 |
| 5,502,486 | 3/1996 | Ueda et al. | 348/239 |
| 5,523,861 | 6/1996 | Tanaka et al. | 358/475 |
| 5,696,603 | 12/1997 | Toyomura et al. | 358/458 |
| 5,701,366 | 12/1997 | Ostromoukhov et al. | 382/237 |

*Primary Examiner*—Leo H. Boudreau
*Assistant Examiner*—Kanji Patel
*Attorney, Agent, or Firm*—Sughrue, Mion, Zinn, Macpeak & Seas, PLLC

[57] ABSTRACT

An image processing system and method for laser-printing a composite image containing a monotone image and a multi gradation-level image in a superposed fashion such that the contours of characters in the monotone image are well smoothed without degrading the multi gradation-level image. The multi gradation-level image remains a faithful reproduction of the original and the resultant composite image is improved.

When receiving a composite image 2, an image processing system binarize the pixel values of the composite image 2, to reproduce a mono-tone image 8. At the same time, the system generates a multi gradation-level, N-fold density image 10 from the composite image 2. The mono-tone image 8 is subjected to a smoothing process to smooth the contours of characters. The pixels corresponding to a corrected pixel area 17 in the mono-tone image 8 of the N-fold density image 10 are converted into white pixels by masking the corrected pixel area. Thereafter, the smoothed monotone image 16 and the N-fold density image 18 are superposed one on the other, to thereby form a final image 22.

14 Claims, 5 Drawing Sheets

IMAGE PROCESSING SYSTEM AND METHOD

BACKGROUND OF THE INVENTION

The present invention relates to an image processing system for printing, in a laser printer, a composite image which contains a multi gradation-level image, for example, a photograph and a monotone image (e.g., characters or a line drawing) in a superposed manner.

In the laser printer, the width of a dot to be formed on a paper can readily be varied by adjusting the width of a laser pulse. To print a multi gradation-level image such as a photograph, with a laser printer, the image is converted to corresponding image data. In the conversion to image data, each pixel of the image is virtually divided into small rectangles. A gradation level or value of each pixel is expressed by the number of small rectangles that are to be painted black with a laser beam or in which dots are to be formed (viz., how the laser pulse width is selected for the pixel). If one pixel is divided into N small rectangles, for example, a gradation value of one pixel may be expressed in (N+1) steps ranging from 0 to N. The multi gradation-level image thus converted will be hereinafter referred to as an "N-fold density image."

The N-fold density image consists of binary data trains, in which binary data each consisting of a given number of bits, which are representative of a pattern-of-dot array in each pixel, are arranged in accordance with an array of pixels. Various methods for reducing the number of bits of the binary data of each pixel have been known. The binary data of the pixels, which form an N-fold density image, indicates the small rectangle or rectangles to be painted black with a laser beam, viz., in which a dot or dots are to be formed. Accordingly, the printer can print the multi gradation-level image on a paper by modulating the laser pulse width in accordance with the binary data.

The dots printed by the laser printer have such a nature that closely located dots likely gather under the electric field, to form a dot block of which the configuration is smooth. When a monotone (black/white) image of characters or a line drawing is printed by the laser printer, a technique of smoothing is frequently used. Smoothing techniques make the contours of characters or a line drawing smooth and natural by taking advantage of the above nature of closely located dots. Basically, the monotone image is expressed by binary data trains in which one bit, assigned to one pixel, indicates whether or not the pixel is black or white (a dot is formed or not). In the smoothing process, small dots corresponding to the small rectangles are added to or removed from the pixels located on the contour of a character or a line drawing (both will be referred to as a character) in the monotone image. In the smoothing process, the monotone image is expressed by binary data trains in which a plural number of bits are assigned to one pixel as in the N-fold density image.

As seen from the above description, the multi gradation-level image is faithfully printed in accordance with its binary data train to maintain the accuracy of the printed picture. In the monotone image, its binary data trains are subjected to the smoothing process to enhance the readability and clarity of the printed picture. Therefore, the necessity of the smoothing depends on whether or not the image data input to the printer is a monotone image or a multi gradation-level image.

An image in which characters or a graph is half-tone screened is equivalent to a composite image in which a monotone image of characters or a graph and a multi gradation-level image of the half-tone screen are superposed one on the other. In this case, it is impossible to obtain the best print result, regardless of whether the smoothing is used. The reason for this is that if the smoothing is performed, the characters of the monotone image will be corrected to have beautiful contours. However, the smoothing would also be applied in part to an area of the multi gradation-level image. The result is generation of unwanted noise particularly in the halftone region of the image. If smoothing is not performed, a region of the multi gradation-level image is finely printed, but the contours of the characters of the monotone image are not likely to be smooth.

SUMMARY OF THE INVENTION

Accordingly, an object of the present invention is to provide an image processing system for a laser printer which is capable of printing a composite image containing a monotone image and a multi gradation-level image in a superposed fashion, such that the contours of characters in the monotone image are well smoothed and the multi gradation-level image is a faithful reproduction of the original one, and thus the resultant composite image is of very high overall quality.

The present invention relates to a system for processing a composite image containing a multi gradation-level image and a monotone image, and a method for processing the same. In the present invention, a composite image, which is input to the processing system, takes the same data format as of the N-fold density image. To be more specific, each pixel is virtually divided into small areas. The value of each pixel of the composite image is expressed by binary data representative of a dot or empty pattern to be formed in those small areas. In the system and method of the present invention, the binary data of each pixel of the input composite image is binarized to reproduce an original monotone image. Simultaneously with the binarizing, a dot pattern of each pixel is generated from the binary data of each pixel of the input composite image, to thereby reproduce an original multi gradation-level image. The reproduced monotone image is subjected to the smoothing, to correct the contours of the characters. Finally, the corrected monotone image and the reproduced multi gradation-level image are superposed while giving a preference to the characters in the monotone image.

In the final image thus formed, monotone characters are clear and smooth in their contours, and a multi gradation-level image as its background is faithfully reproduced. Accordingly, the final image is clear, beautiful and of high overall image quality.

In a preferred mode of the invention, the characters in the monotone image are given a preference or priority in the final superposing process for superposing the monotone image and the multi gradation-level image. Therefore, before superposing, the pixel portion which corresponds to the characters is masked. The pixel portion to be masked may be specified in several ways as will be discussed in the description of the preferred embodiment. Each masking approach has advantages and disadvantages, and may be selected by the user depending on the specific circumstances.

DETAILED DESCRIPTION OF A PREFERRED EMBODIMENT

Figure 1:
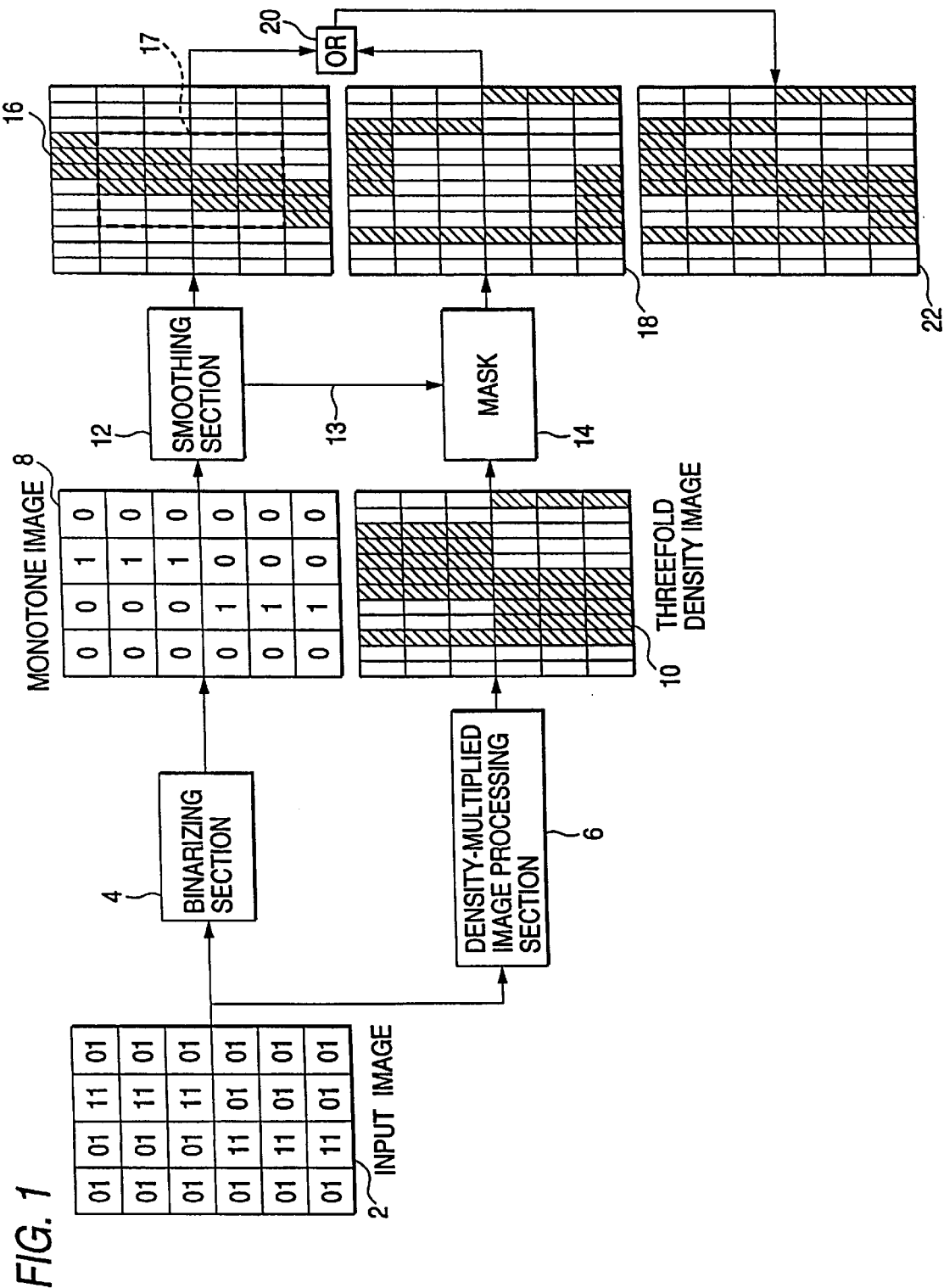
FIG. 1 is a block diagram showing a configuration of an image processing device for a laser printer according to a first embodiment of the present invention.

FIG. 1 is a diagram showing a configuration of an image processing device for a laser printer according to an embodiment of the present invention. The image processing device may be realized by a hardware circuit specially designed and assembled into a laser printer or software contained in the laser printer. Further, it may be realized by using a printer driver of a host computer.

Figure 2:
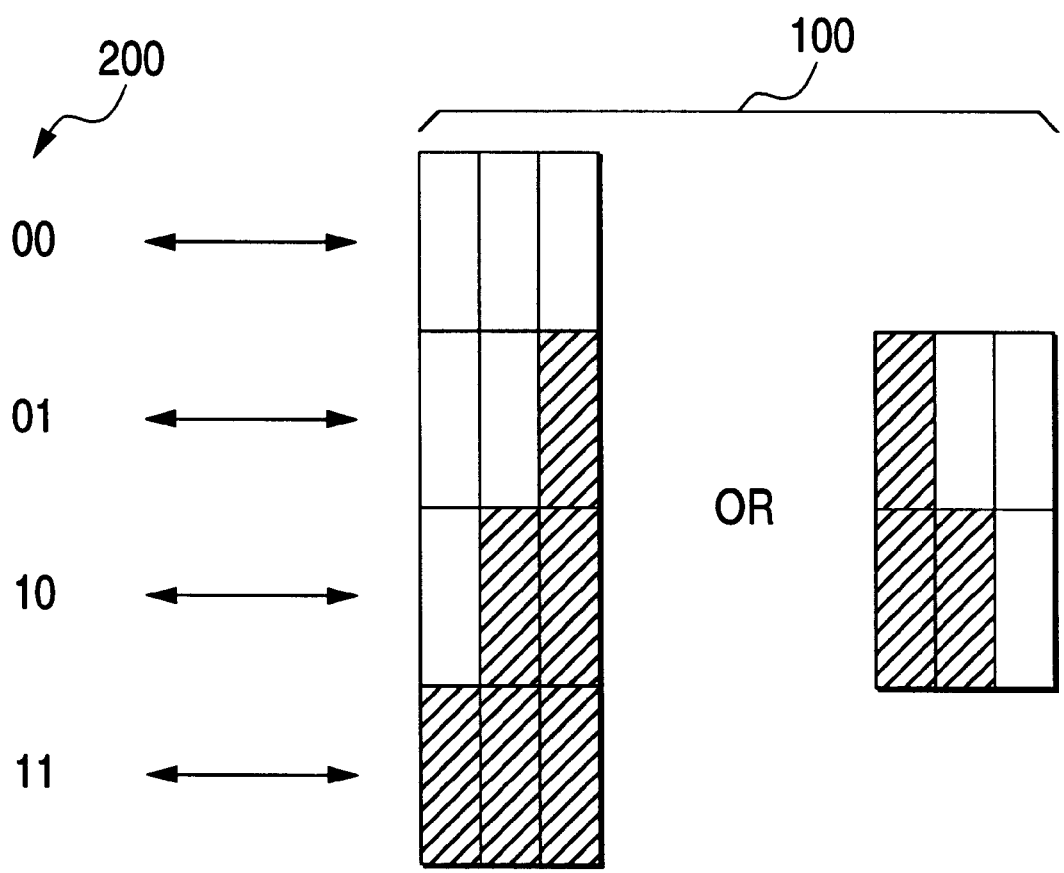
FIG. 2 is a diagram showing the meaning of binary data of an input image processed by the image processing device of FIG. 1.

An input image 2 is a composite image that may contain a multi gradation-level image and a monotone image. In the input image 2, as shown in FIG. 2, one pixel is divided into three small rectangles. Accordingly, the input image 2 is constructed on the basis of a threefold density image 100 which can express a gradation of one pixel in four levels. The pixel values of the threefold density image 100 are each compressed into binary data 200 of 2 bits wide. To be more specific, the gradation value of the pixel in which the number of dots printed therein is 0 is expressed by binary data "00" of two bits. When the pixel includes one dot printed therein, "01" represents its gradation value. When it includes two dots, "10" represents its gradation value. When it includes three dots, the gradation value is represented by "11." In this case, the pixel is a full black pixel. The pixel having a 2-bit value of "11," i.e., the full black pixel, should be considered to be one of the pixels constituting a character in the monotone image. Hence, it is subjected to the smoothing. Strictly, the full black pixel also contains a portion of the highest density in the multi gradation-level image. The smoothing operation only slightly affects the image quality of the highest density portion of multi gradation-level image. The pixels valued "00" to "10" form a halftone region in the multi gradation-level image. It would be better to avoid the application of the smoothing to this region.

In the image processing device shown in FIG. 1, the input image 2 is first transferred to a binarizing section 4 and a density-multiplied image processing section 6, simultaneously. The binarizing section 4 processes the input image 2 to reproduce an original monotone image 8 as the result of the processing. Specifically, if a pixel of the input image 2 is expressed by binary data of "11" of a 2-bit value, the binarizing section 4 converts the binary data to "1" of a 1-bit value. If the pixel has any of the 2-bit values other than "11," the binarizing section 4 converts it to "0." Through the 2-bit value converting process, only the pixels of "1's" are extracted to reproduce the original monotone image of "1's."

The original monotone image 8 is then input to a smoothing section 12. The smoothing section 12 adds or removes small rectangles to or from the necessary pixels that form the contours of characters in the original monotone image 8 in a known manner. As a result, a monotone image 16 is formed with smoothed character contours. In the corrected monotone image 16 illustrated by way of example in FIG. 1, a pixel area corrected by adding and removing the small rectangles to and from the contour pixels is enclosed by a dotted line, and is designated by reference numeral 17. The smoothing section 12 sends a correcting signal 13 to a masking section 14 in synchronism with the correcting operation of the individual pixels in the original monotone image 8. Information on the corrected pixel area 17 is sent to the masking section 14 by the correcting signal 13.

The density-multiplied image processing section 6 removes the compression of the pixels of the input image 2 to reproduce an original threefold density image 10. The reproduced threefold density image 10 is input to the masking section 14. The masking section 14 outputs the received threefold density image 10 straightforwardly or without any processing of the image pixels, when it does not receive the correcting signal 13. When receiving the correcting signal 13, it converts the values of the pixels of the threefold density image 10 to "000," i.e., the value of empty pixels. Meanwhile, the pixel processing in a system including the density-multiplied image processing section 6 is synchronized with that in a system including the binarizing section 4 and the smoothing section 12. Therefore, both the systems process the pixels located at the same positions at the same time. Accordingly, the masking section 14 masks only the pixel area 17 corrected by the smoothing in the input threefold density image 10. In other words, the masking section 14 converts the pixels in this area into empty pixels.

Finally, the corrected monotone image 16 derived from the smoothing section 12 and a multi gradation-level image 18 derived from the masking section 14 are applied to an OR section 20 where those images are superposed to form a final image 22. The corrected pixel area 17 in the corrected monotone image 16 positionally corresponds to the masked empty pixel area in the multi gradation-level image 18. Accordingly, when those are superposed, the corrected pixel area 17 is put in the empty pixel area. In other words, the corrected monotone image 16 and the multi gradation-level image 18 are superposed one on the other while giving a preference to the characters in the monotone image. In the final image 22 thus formed, the contours of the monotone characters are corrected and clear, and the multi gradation-level image is a faithful reproduction of the original one. The final image has very good overall quality.

In the image processing device shown in FIG. 1, the masking section 14 masks the multi gradation-level image 18 to give a preference to the characters in the corrected monotone image 16. For this purpose, a character signal indicative of the pixels (i.e., black pixels) of the characters, in place of the correcting signal 13, may be applied to the masking section 14, from the binarizing section 4. In this case, to match the pixels designated by the character signal with those processed by the masking section 14, some timing adjustment is required. To eliminate or simplify the timing adjustment, the masking section 14 may be interchanged with the density-multiplied image processing section 6.

In case where the character signal is used instead of the correcting signal 13, the pixel area to be masked is not the corrected pixel area 17 but the character area of the original monotone image 8. Which of those masking methods is preferable for the image quality of the final image 22 is determined on a case-by-case basis. When the characters are distinctly outlined against the background of the multi gradation-level image in order to make the characters legible, it is preferable to use the masking method based on the correcting signal 13. When the boundary between the characters and the background is made indistinct to put the characters in harmony with the background, it is preferable to use the masking method based on the character signal. Accordingly, the device may be designed so that a user can select either of the masking methods as desired.

Figure 4:
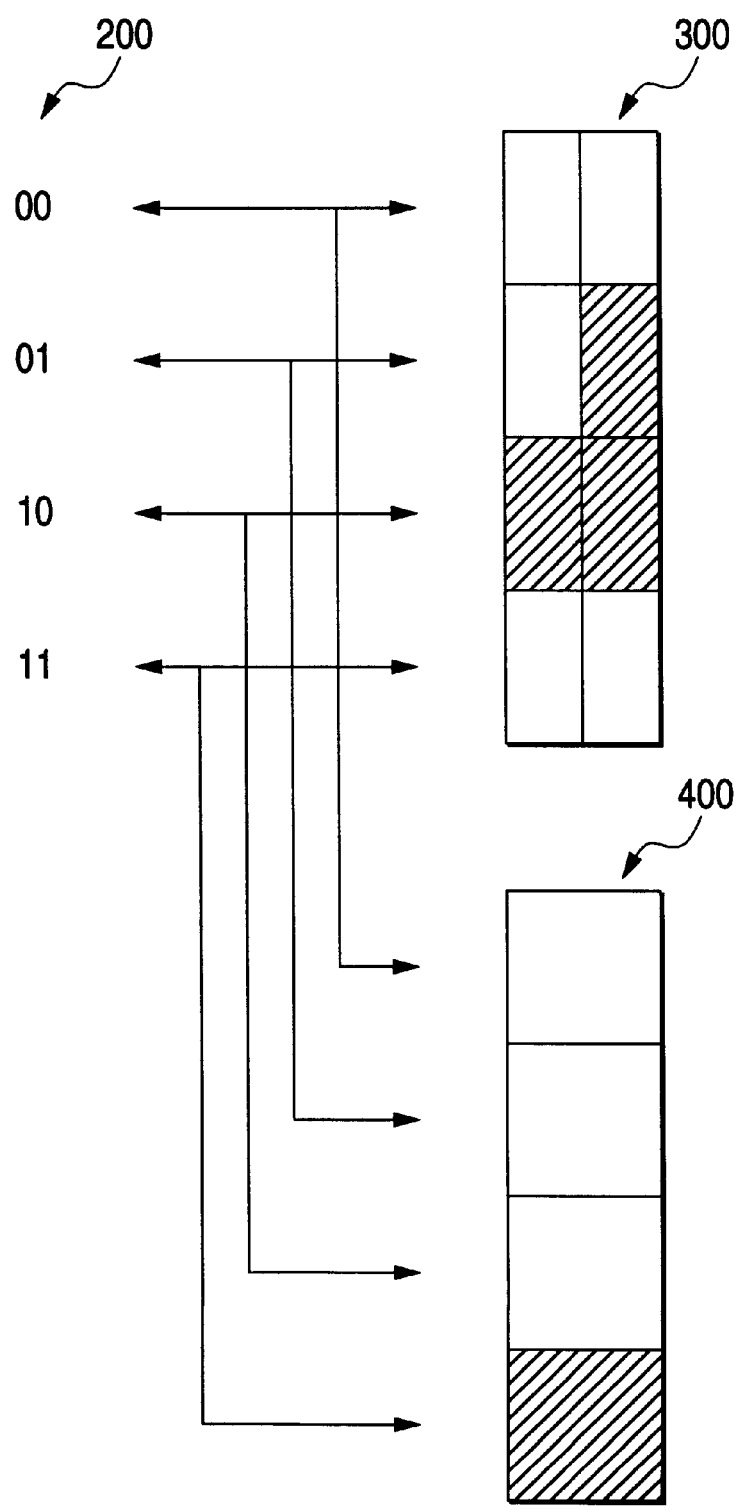
FIG. 4 is a diagram showing the meaning of binary data of an input image processed by the image processing device of FIG. 3.
Figure 5:
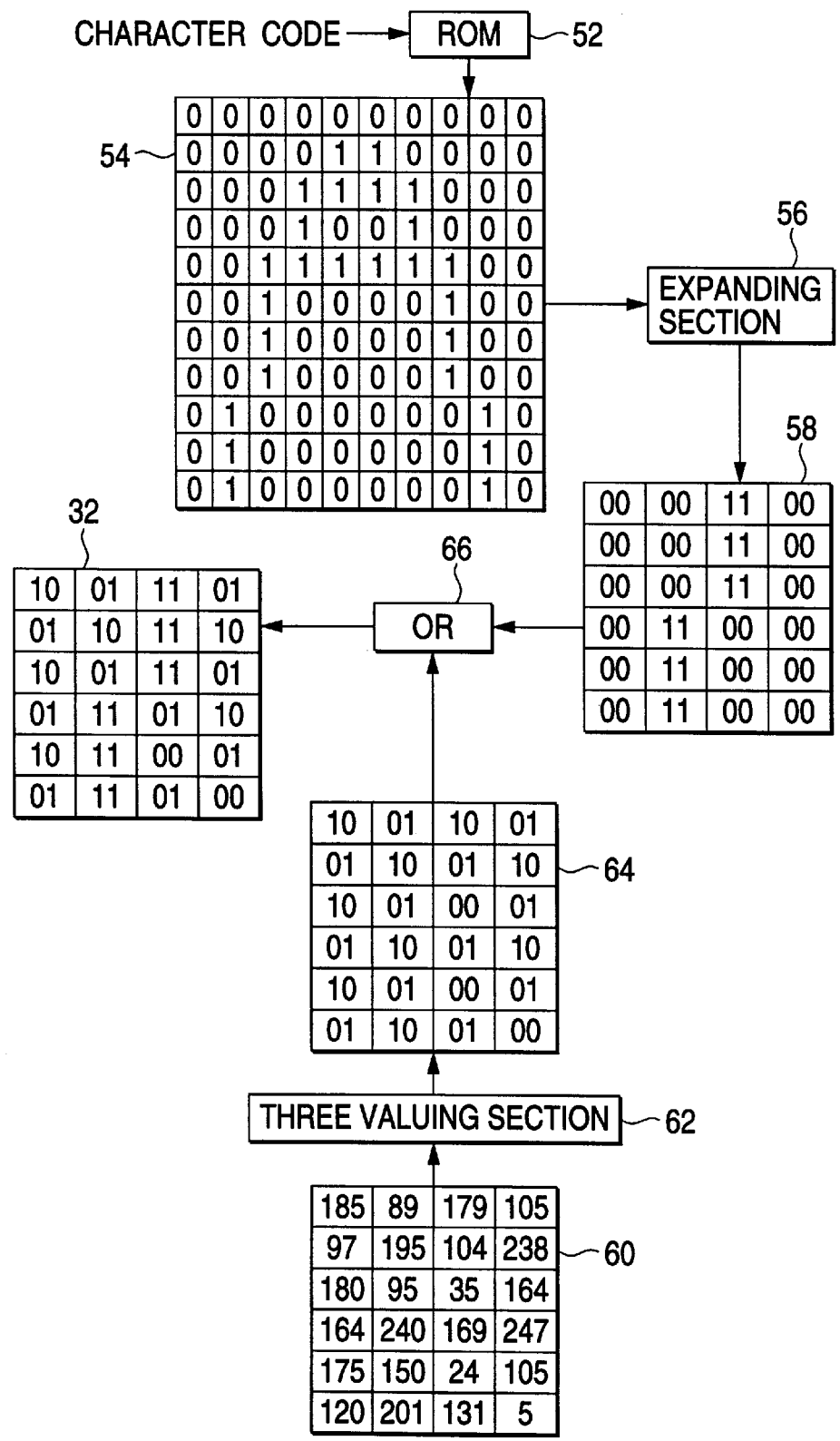
FIG. 5 is a block diagram showing a configuration of an input image forming device used in the image processing device of FIG. 4.

In the image processing device shown in FIG. 1, there is a probability that the highest density region in the multi gradation-level image is subjected to the smoothing. In this case, deterioration of the multi gradation-level image is considered to be small, but not zero. A second embodiment of the present invention shown in FIGS. 3 through 5 is constructed such that a probability that the multi gradation-level image is subjected to the smoothing is completely eliminated by perfectly discriminating a multi gradation-level image and a monotone image.

Figure 3:
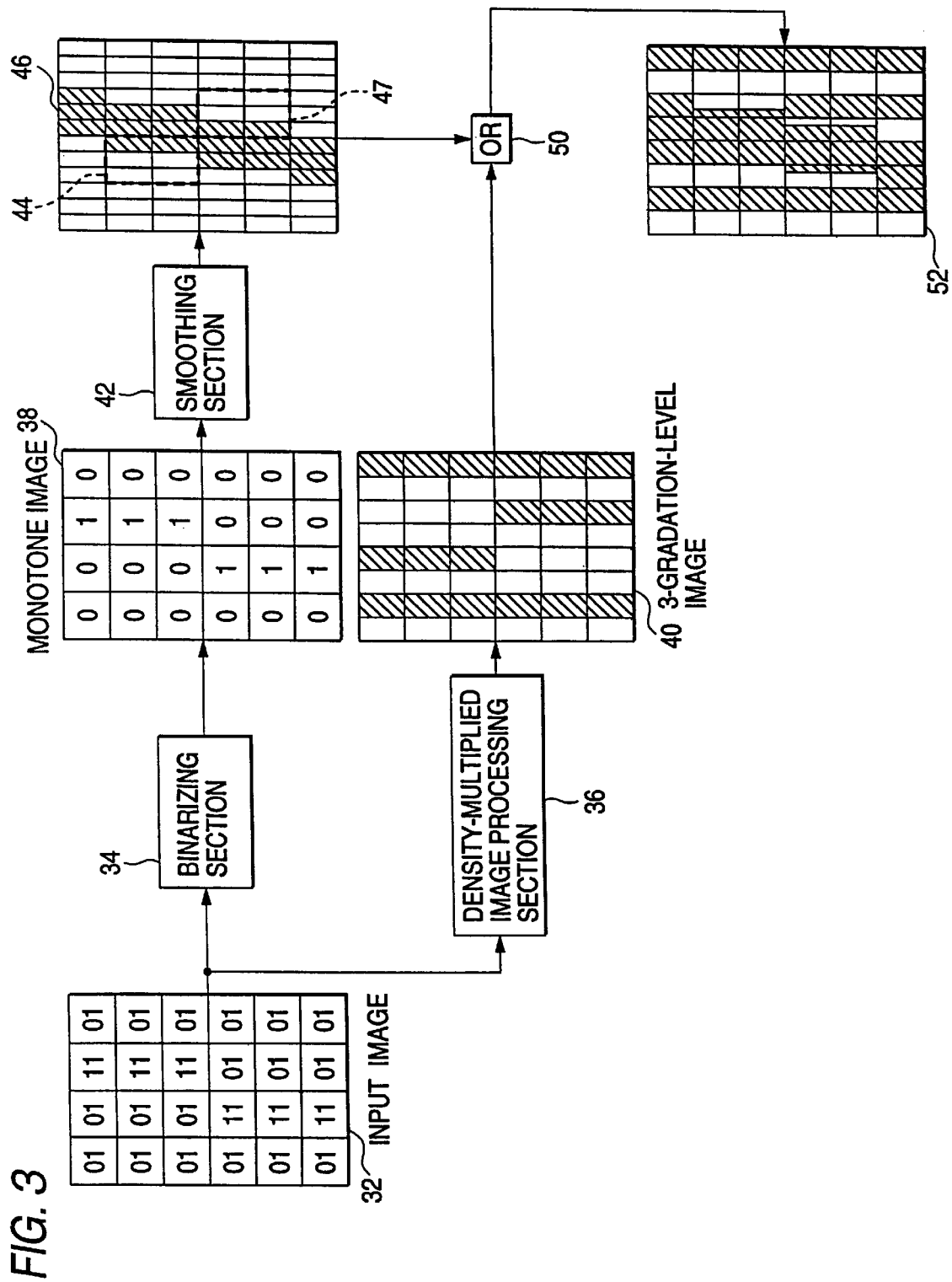
FIG. 3 is a block diagram showing a configuration of an image processing device for a laser printer according to a second embodiment of the present invention.

As shown in FIG. 3, an input image 32, like the input image 2 shown in FIG. 1, is expressed by binary data trains in which 2 bits are used for expressing one pixel. As shown in FIG. 4, of the input image 32, 2-bit data "00," "01," and "10" are exclusively used for a multi gradation-level image 300 and 2-bit data "11" is exclusively used for a monotone character 400. The multi gradation-level image 300 is a twofold density image in which white, gray and black pixels are expressed by 2-bit data "00," "01" and "10," respectively. 2-bit data "11" is meaningless in the multi gradation-level image (viz., it is equivalent to a white pixel.). In the monotone image 400, a character 400 is expressed by 2-bit data "11," while white pixels forming the background are expressed by any of the other three different 2-bit data.

In the device shown in FIG. 3, the input image 32 is first applied to a binarizing section 34 and a density-multiplied image processing section 36, simultaneously. The binarizing section 34 converts 2-bit data "11" to 1-bit data "1" that is indicative of a black pixel, and all other 2-bit data to 1-bit data "0" that is indicative of a white pixel. By the data conversion, the binarizing section 34 reproduces an original monotone image designated by numeral 38. The density-multiplied image processing section 36 responds to 2-bit data "00," "01," and "10" of the input image 32 and produces the pixels values of a corresponding 3-gradation-level, twofold density image, but does not respond to 2-bit data "11." No response thereof to 2-bit data "11" is equivalent to the execution of the masking function.

The original monotone image 38 is input to a smoothing section 42 where the pixels on the contour of the character are corrected in a manner that is similar to that as already described referring to FIG. 1. A monotone image 46 output from the smoothing section 42 and a 3-gradation-level image 40 output from the density-multiplied image processing section 36 are superposed one on the other by an OR circuit 50, to thereby form a final image 52.

A masking section is not used in the image processing device since the density-multiplied image processing section 36 has the masking function as described above. The density-multiplied image processing section 36, when its masking function operates, masks a character area of the original monotone image 38, but does not mask an area where dots are added by the smoothing but the pixels are originally white pixels, like an area 47 enclosed by a dotted line in the corrected monotone image 46. To mask additionally such an area 47, the masking section 14 using the correcting signal 13 for masking may be used. Which of the masking methods is preferable is determined on a case-by-case basis, as referred to in the description of the first embodiment. The device may be designed such that the user selects either of the masking methods as desired.

FIG. 5 is a diagram showing a configuration of a device for forming an input image 32, which is used in the image processing device. The input image forming device may be realized by a hardware or software contained in the printer. Alternatively, the function of the input image forming device may be realized by a print driver in a host computer.

In the device shown in FIG. 5, a ROM 52 is a character generator in which bit map images of various characters are stored. The ROM 52 is addressed by a character code and produces a bit map image 54 of a character corresponding to the character code. The map image 54 is a monotone image expressed in a manner that one pixel thereof is expressed by 1-bit data. An expanding section 56 expands the monotone image 54 two times in the horizontal direction into a twofold density image 58. In FIG. 5, the twofold density image 58 corresponding to a portion enclosed by a solid line in the monotone image 54 is typically illustrated.

A multi gradation-level, original image 60 to be used as the background of the character corresponding to the character code is generated by a process, which is different from that for forming the character code. The original image 60 is an image of 256 gradation levels in which each pixel is expressed by 8-bit data. Then, a three valuing section 62 converts the multi gradation-level original image 60 of 256 gradation levels to a twofold density image 64 of 3 gradation levels. Any of the various known converting techniques is available for the conversion. In the simplest method, the gradation levels 0 to 85 in the original image 60 are converted to "00" of 2-bit data, the gradation levels 86 to 170, to "01," and the gradation levels 171 to 255, to "10."

Finally, an OR circuit 66 superposes the monotone image 58 and the twofold density image 64 one on the other, to form an input image 32 as described above.

While the embodiment of the invention that is at present considered to be preferred has been described, it should be understood that various modifications may be made while still using the true spirit and scope of the invention.

What is claimed is:

1. A system for processing a composite image which contains a multi gradation-level image and a monotone image and is expressed by binary data representative of patterns of dots and empty spaces to be formed in small areas in each of the pixels of the composite image, said system comprising:

binarizing means for binarizing the binary data of the pixels of said composite image, detecting areas of said composite image which correspond to characters of said monotone image, and deriving said monotone image from said composite image;

density-multiplied image processing means for reproducing and outputting said multi gradation-level image by generating said patterns from the binary data of the pixels of said composite image;

smoothing means for correcting pixel areas which represent contours of said characters by smoothing the monotone image derived from said binarizing means and outputting a smoothed monotone image; and composing/generating means for generating a final image by composing the multi gradation-level image output from said density-multiplied image processing means and the smoothed monotone image output from said smoothing means, such that the characters in said smoothed monotone image have priority over the corresponding pixels in said multi gradation-level image.

2. The image processing system according to claim 1, wherein said composing/generating means includes masking means for partially masking said multi gradation-level image so that characters in said smoothed monotone image are given priority.

3. The image processing system according to claim 2, wherein said masking means masks a pixel area in said multi gradation-level image that corresponds to said contour area corrected by said smoothing means.

4. The image processing system according to claim 2, wherein said masking means masks a pixel area in said multi gradation-level image that corresponds to the characters detected by said binarizing means.

5. The image processing system according to claim 2, wherein said masking means comprises:

first masking means for masking a pixel area in said multi gradation-level image that corresponds to the corrected pixel area corrected by said smoothing means; and second masking means for masking a pixel area in said multi gradation-level image that corresponds to the characters detected by said binarizing means;

said image processing system being operable to select one of said first and second masking means.

6. The image processing system according to claim 1, wherein said binarizing means converts binary data representing a first pattern in which dots are formed in all of the small areas of the pixel to a first value, and converts binary data representing other patterns than said first pattern to a second value, such that said derived monotone image is based upon said first and second values.

7. The image processing system according to claim 1, wherein said composite image contains first binary data for specifying the pixels corresponding to the characters of said monotone image, and a set of binary data, different from said first binary data, for specifying the pixels for the entire area of said multi gradation-level image, said binarizing means operable to convert said first binary data to a first value and said different set of binary data to a second value, to thereby reproduce a monotone image having said first and second values, and said density-multiplied image processing means is operable to respond to said binary data set and generate a pattern of pixels in a multi gradation-level image so that the characters in said smoothed monotone image can be composed by said composing/generating means.

8. A method for processing a composite image which contains a multi gradation-level image and a monotone image and is expressed by binary data representative of patterns of dots and empty spaces to be formed in small areas in each of the pixels of the composite image, said method comprising the steps of:

binarizing the binary data of the pixels of said composite image;

detecting areas of said composite image which correspond to characters of said monotone image;

deriving said monotone image from said composite image;

reproducing and outputting said multi gradation-level image by generating said patterns from the binary data of the pixels of said composite image;

smoothing said derived monotone image by correcting pixel areas which represent contours of said characters and outputting a smoothed monotone image; and generating a final image by composing the reproduced multi gradation-level image and the smoothed monotone image while giving priority to the characters in said smoothed monotone image.

9. The method for processing a composite image according to claim 8, wherein said generating step includes a masking step to partially mask said multi gradation-level image so that characters in said smoothed monotone image are given priority over corresponding areas in said multi gradation-level image.

10. The method for processing a composite image according to claim 9, wherein said masking step further comprises masking a pixel area in said multi gradation-level image that corresponds to said contour area corrected in said smoothing step.

11. The method for processing a composite image according to claim 9, wherein said masking step further comprises masking a pixel area in said multi gradation-level image that corresponds to said detected characters.

12. The method for processing a composite image according claim 9, wherein said masking step further comprises selecting and performing one of:

a first masking step of masking a pixel area in said multi gradation-level image that corresponds to the corrected pixel area corrected in said smoothing step; and a second masking step of masking a pixel area in said multi gradation-level image that corresponds to said detected characters.

13. The method for processing a composite image according to claim 8, said binarizing step further comprising the steps of:

converting binary data representing a first pattern in which dots are formed in all of the small areas of the pixel to a first value, and converting binary data representing other patterns than said first pattern to a second value, wherein said derived monotone image is based on said first and second values.

14. The method for processing a composite image according to claim 8, further comprising the steps of:

specifying the pixels corresponding to the characters of said monotone image with a first binary data;

specifying the pixels for the entire area of said multi gradation-level image with a set of binary data which is different from said first binary data;

converting said first binary data to a first value and said set of different binary data to a second value;

reproducing a monotone image having said first and second values;

generating a pattern of pixels in a multi gradation-level image based on said set of different binary data; and combining said reproduced monotone image with said generated multi gradation-level image so that the characters in said monotone image are masked.

* * * * *